United States Patent [19]
Ishii et al.

[11] Patent Number: 5,356,964
[45] Date of Patent: Oct. 18, 1994

[54] STABILIZED POLYOLEFIN COMPOSITION

[75] Inventors: Tamaki Ishii, Suita; Shinichi Yachigo, Toyonaka; Fumitoshi Kojima, Ibaraki; Kanako Ida, Ashiya, all of Japan

[73] Assignee: Sumitomo Chemical Company, Limited, Osaka, Japan

[21] Appl. No.: 988,696

[22] Filed: Dec. 10, 1992

[30] Foreign Application Priority Data

Dec. 11, 1991 [JP] Japan ................... 3-327387

[51] Int. Cl.$^5$ ............... C08K 5/3492; C08K 5/11
[52] U.S. Cl. ................ 524/100; 524/101; 524/120; 524/125; 524/128; 524/153; 524/291
[58] Field of Search .............. 524/100, 101, 120, 125, 524/128, 153, 291

[56] References Cited

U.S. PATENT DOCUMENTS

| | | | |
|---|---|---|---|
| 4,025,486 | 5/1977 | Gilles | 524/101 |
| 4,086,204 | 4/1978 | Cassandrini et al. | 524/100 |
| 4,234,707 | 11/1980 | Rody et al. | 525/437 |
| 4,331,586 | 5/1982 | Hardy | 525/186 |
| 4,365,032 | 12/1982 | Yosizato et al. | 524/99 |
| 4,525,514 | 6/1985 | Yachigo et al. | 524/291 |
| 4,732,923 | 3/1988 | Takata et al. | 524/291 |
| 4,774,274 | 9/1988 | Takata et al. | 524/291 |
| 4,912,156 | 3/1990 | Yagi et al. | 524/291 |
| 4,939,196 | 7/1990 | Sasaki et al. | 524/291 |
| 4,985,479 | 1/1991 | Nagasaki et al. | 524/291 |

*Primary Examiner*—Kriellion S. Morgan
*Attorney, Agent, or Firm*—Wenderoth, Lind & Ponack

[57] ABSTRACT

A polyolefin composition comprising a polyolefin, and the following components:

(A) a phenolic compound such as 1,3,5-tris(3,5-di-t-butyl-4-hydroxybenzyl) isocyanurate;

(B) an acrylate compound represented by the formula (I):

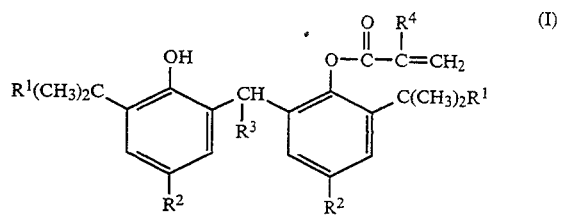

wherein $R^1$ is an alkyl of 1 to 5 carbon atoms, $R^2$ is an alkyl of 1 to 8 carbon atoms, $R^3$ is hydrogen or an alkyl of 1 to 8 carbon atoms, and $R^4$ is hydrogen or methyl;

(C) an organic phosphorous compound such as bis(2,6-di-t-butyl-4-methylphenyl) pentaerythritol diphosphite; and (D) a hindered piperidine compound such as poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}]. This composition is stable against thermal processing, thermal oxidation, light oxidation and discoloration, and it is especially useful for fibers and films.

13 Claims, No Drawings

STABILIZED POLYOLEFIN COMPOSITION

The present invention relates to a stabilized polyolefin composition, and more particularly it relates to a polyolefin composition which is not only stable against thermal deterioration during high temperature processing and against thermal oxidative deterioration and light oxidative deterioration during usage but also extremely stable against discoloration by combustion gas or nitrogen oxide gas (hereinafter referred to as "NOx gas").

Since polyolefin resins, including polyethylene, polypropylene and the like, have excellent physical, chemical and electrical properties, they are widely used as materials for fibers, films, sheets and other shaped articles. These polyolefin resins, however, have some problems in that they tend to deteriorate under the action of heat during processing and under the action of heat, light and oxygen during usage, thereby degrading their mechanical properties.

In order to control such deterioration, various stabilizers, such as phenolic antioxidants and organic phosphorous antioxidants, have heretofore been used. For example, the phenolic antioxidants conventionally used include 2,6-di-t-butyl-4-methylphenol, 1,3,5-tris(3,5-di-t-butyl-4-hydroxybenzyl) isocyanurate, 1,3,5-tris(4-t-butyl-3-hydroxy-2,6-dimethybenzyl) isocyanurate, tetrakis[methylene-3-(3,5-di-t-butyl-4-hydroxyphenyl)propionate]methane, and the like.

The organic phosphorous antioxidants conventionally used include, for example, distearyl pentaerythritol diphosphite, tris(2,4-di-t-butylphenyl) phosphite, bis(2,4-di-t-butylphenyl) pentaerythritol diphosphite, tetrakis(2,4-di-t-butylphenyl) 4,4'-biphenylene diphosphonite, and the like.

Although polyolefin compositions conventionally proposed have shown some improvements in thermal oxidation resistance and light oxidation resistance during usage, they have still been insufficient in heat resistance during high temperature processing. Especially in the field of fibers, films or the like, where the polyolefin composition undergoes severe production conditions and usage conditions, there are still some problems, and the conventional technologies are not so practically satisfactory.

For example in the field of fibers, since the conditions of production and processing are severer than those for usual thick articles, the composition has, in the first place, to endure high temperatures in the production process. In drying after fiber formation, city gas or kerosene is often used as a heat source, and since the polyolefin fibers are easily discolored by the combustion gas from the heat source, they are also desired to resist such discoloration. Further, the final fiber products are also exposed to exhaust gas, such as combustion gas from fuel of automobiles or the like in outdoor usage and combustion gas from a kerosene stove or the like in interior usage. Since the polyolefin fibers tend to be discolored by NOx gas contained in the exhaust gas, they are also desired to resist such discoloration.

Though polyolefin compositions conventionally proposed are fairly stable against thermal oxidation and light oxidation during usage, they are not so satisfactory in heat resistance during high temperature processing, and also they have insufficient stability against discoloration by combustion gas or NOx gas. Thus, it has been strongly desired to develop a stabilizer formulation which stabilizes the polyolefin against heat during high temperature processing and against thermal oxidation and light oxidation during usage, and also shows good resistance against discoloration by combustion gas or NOx gas.

As a result of intensive research to develope a polyolefin composition which has practically sufficient stabilities against heat during high temperature processing and against thermal oxidation and light oxidation during usage and is also stable against discoloration by combustion gas or NOx gas, it has been found that the combined use of a particular hindered phenolic compound, a particular acrylate compound, a particular organic phosphorous compound and a particular hindered piperidine compound gives quite excellent properties, thereby accomplishing the present invention.

Briefly, the present invention provides a polyolefin composition comprising a polyolefin and, per 100 parts by weight of the polyolefin, the following components (A), (B), (C) and (D):

(A) 0.01 to 1 part by weight of a hindered phenolic compound selected from 1,3,5-tris(3,5-di-t-butyl-4-hydroxybenzyl) isocyanurate, 1,3,5-tris(4-t-butyl-3-hydroxy-2,6-dimethylbenzyl) isocyanurate, and calcium bis(ethyl 3,5-di-t-butyl-4-hydroxybenzylphosphonate);

(B) 0.01 to 1 part by weight of an acrylate compound represented by the formula (I):

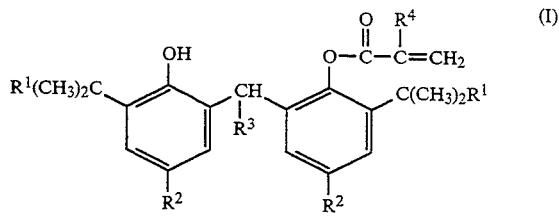

wherein $R^1$ is an alkyl of 1 to 5 carbon atoms, $R^2$ is an alkyl of 1 to 8 carbon atoms, $R^3$ is hydrogen or an alkyl of 1 to 8 carbon atoms, and $R^4$ is hydrogen or methyl;

(C) 0.01 to 1 part by weight of an organic phosphorous compound selected from bis(2,6-di-t-butyl-4-methylphenyl) pentaerythritol diphosphite, bis(2,4-di-t-butylphenyl) pentaerythritol diphosphite, tris(2,4-di-t-butylphenyl) phosphite, tetrakis(2,4-di-t-butylphenyl) 4,4'-biphenylene diphosphonite, 2,2'-ethylidenebis(4,6-di-t-butylphenyl) fluorophosphite, and 2,2'-methylenebis(4,6-di-t-butylphenyl) octyl phosphite; and (D) 0.01 to 1 part by weight of a hindered piperidine compound selected from a polycondensate of dimethyl succinate with 1-(2-hydroxyethyl)-4-hydroxy-2,2,6,6-tetramethylpiperidine, poly[{6-(1,1,3,3-tetramethylbutyl)imino-1,3,5-triazin-2,4-diyl}{2,2,6,6-tetramethyl-4-piperidyl)imino}hexamethylene{(2,2,6,6-tetramethyl-4-piperidyl)imino}], and poly[(6-morpholino-1,3,5-triazin-2,4-diyl){2,2,6,6-tetramethyl-4-piperidyl)imino)hexamethylene{(2,2,6,6-tetramethyl-4-piperidyl)imino}].

The invention further provides a process for producing a polyolefin shaped article by blending a polyolefin with the aforementioned components (A), (B), (C) and (D), and forming the resulting composition into a shaped article such as fiber or film, thereby stabilizing the shaped article against heat, light and oxidation as well as against discoloration by combustion gas or NOx gas. The invention still further provides a polyolefin fiber or film prepared from the aforementioned composition.

The polyolefin to be used in the invention can be a homopolymer of an α-olefin including ethylene, propylene, butene-1, isobutene, 3-methylbutene-1, hexene-1, 4-methylpentene-1 or the like, or a random or block copolymer obtainable from two or more of the α-olefins. Specific examples thereof are polyethylene, polypropylene, polybutene-1, polyisobutene, poly-3-methylbutene-1, polyhexene-1, poly-4-methylpentene-1, ethylene/propylene copolymer, ethylene/butene-1 copolymer, ethylene/4-methylpentene-1 copolymer, propylene/butene-1 copolymer, propylene/4-methylpentene-1 copolymer, ethylene/propylene/butene-1 copolymer, and the like. Especially preferred is polypropylene including a propylene homopolymer and a copolymer of propylene with a small amount of ethylene.

According to the invention, the polyolefin is blended with the hindered phenolic compound of the component (A), the acrylate compound of the component (B) represented by the above formula (I), the organic phosphorous compound of the component (C) and the hindered piperidine compound of the component (D).

The component (A) is selected from the aforementioned three hindered phenolic compounds, i.e. 1,3,5-tris(3,5-di-t-butyl-4-hydroxybenzyl) isocyanurate, 1,3,5-tris(4-t-butyl-3-hydroxy-2,6-dimethylbenzyl) isocyanurate and calcium bis(ethyl 3,5-di-t-butyl-4-hydroxybenzylphosphonate), which can be used each alone or in combination of two or three.

In the formula (I), which constitutes the acrylate compound of the component (B), $R^1$ is an alkyl of 1 to 5 carbon atoms including methyl, ethyl, propyl, t-butyl, 2,2-dimethylpropyl or the like, but $R^1$ is preferably methyl or ethyl from the viewpoint of thermal stability. $R^2$ in the formula (I) is an alkyl of 1 to 8 carbon atoms including methyl, ethyl, propyl, t-butyl, t-pentyl, t-octyl or the like, but $R^2$ is preferably methyl, t-butyl or t-pentyl from the viewpoint of thermal stability, and especially preferred is t-pentyl. $R^3$ in the formula (I) is hydrogen or an alkyl of 1 to 8 carbon atoms including methyl, ethyl, propyl, butyl, pentyl, octyl or the like, but $R^3$ is preferably hydrogen or methyl from the viewpoint of thermal stability. $R^4$ in the formula (I) is hydrogen or methyl, and hydrogen is preferred from the viewpoint of thermal stability. The acrylate compounds represented by the formula (I) can be used each alone or in combination of two or more.

The component (C) is selected from the aforementioned six organic phosphorous compounds, which can be used each alone or in combination of two or more. Among them, bis(2,6-di-t-butyl-4-methylphenyl) pentaerythritol diphosphite is especially preferred from the viewpoint of thermal and oxidation resistance.

The component (D) to be used in the invention is selected from the aforementioned three hindered piperidine compounds, each of which is an oligomer. Though they can vary somewhat in their polymer ends, they are mainly represented by the following formulae (II-1), (II-2) and (II-3), respectively.

The polycondensate of dimethyl succinate with 1-(2-hydroxyethyl)-4-hydroxy-2,2,6,6-tetramethylpiperidine:

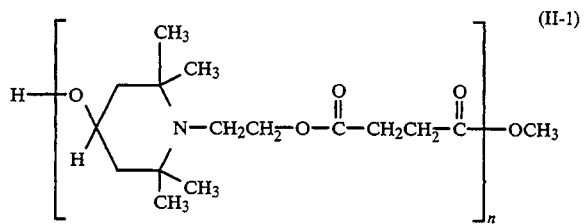

wherein n is from 2 to about 20.

Poly[{(6-(1,1,3,3-tetramethylbutyl)imino-1,3,5-triazin-2,4-diyl}{(2,2,6,6-tetramethyl-4-piperidyl)imino} hexamethylene{(2,2,6,6-tetramethyl-4-piperidyl)imino}]:

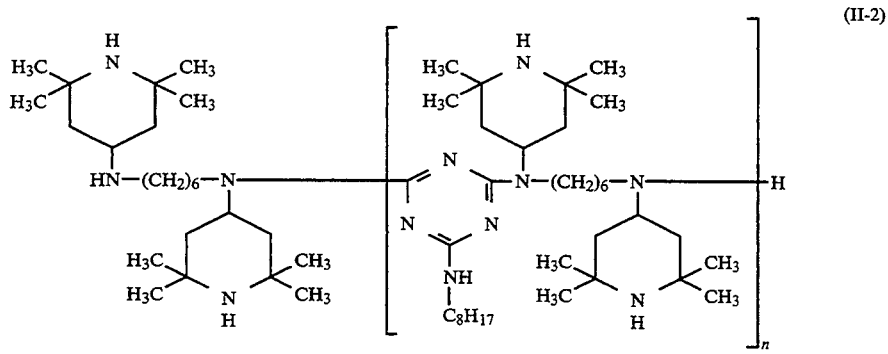

wherein n is from 2 to about 20.

Poly[(6-morpholino-,3,5-triazin-2,4-diyl){(2,2,6,6-tetramethyl-4-piperidyl)imino}hexamethylene{(2,2,6,6-tetramethyl-4-piperidyl)imino}]:

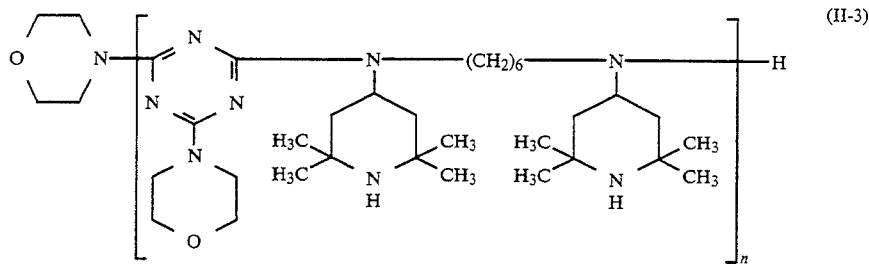

wherein n is from 2 to about 20.

The compound represented by the formula (II-1) is disclosed, for example, in U.S. Pat. No. 4,234,707, and is commercially available as "TINUVIN 622 LD" from Ciba-Geigy Corp. The compound represented by the formula (II-2) is disclosed, for example, in U.S. Pat. No. 4,086,204, and is commercially available as "CHIMASSORB 944 LD" from Ciba-Geigy Corp. The compound represented by the formula (II-3) is disclosed, for example, in U.S. Pat. No. 4,331,586, and is commercially available as "CYASORB UV-3346" from American Cyanamid Co.

These hindered piperidine compounds can be used each alone or in combination of two or three. Among them, preferred are the compound represented by the formula (II-2) and the compound represented by the formula (II-3).

In the invention, all of the components (A), (B), (C) and (D) are essential, and the amounts thereof to be used are respectively 0.01 to 1 part by weight for each component per 100 parts by weight of the polyolefin. When any of the components (A), (B), (C) and (D) is used in an amount less than 0.01 part by weight, the desired effects are insufficiently achieved; whereas when any of them is used in an amount exceeding 1 part by weight, concomitant improvements in the effects corresponding to the increased amount is hardly expected, and such excess use is also uneconomical. Within these ranges, preferred amounts of respective compounds are from about 0.02 to about 0.5 part by weight for the hindered phenolic compound of the component (A), from about 0.02 to about 0.5 part by weight for the acrylate compound of the component (B), from about 0.02 to about 0.5 part by weight for the organic phosphorous compound of the component (C), and from about 0.02 to about 0.5 part by weight for the hindered piperidine compound of the component (D), each per 100 parts by weight of the polyolefin.

The polyolefin composition of the invention may further contain any other additives including antioxidants, light stabilizers, metal soaps, nucleating agents, lubricants, antistatic agents, metal deactivators, flame retardants, neutralization agents, pigments, fluorescent brighteners, alkali metal phosphates and the like, so long as the additives do not adversely affect the basic characteristics of the composition.

In blending the polyolefin with the components (A), (B), (C) and (D) to be used in the invention, or further with other optional additives to be incorporated in case of necessity, any and every method which is suitable for forming a homogeneous blend can be employed. Thus, the starting materials may be blended simultaneously, they may be blended separately in plural stages, or they may be blended as a masterbatch of one or more components. These materials may be kneaded by any usual manner, for instance, by using a single-screw extruder, a double-screw extruder, or the like.

The polyolefin composition of the invention is useful in the field where the composition is processed at a high temperature for the purpose of raising the productivity and in the field of fibers, films and other shaped articles which are desired to be inhibited from discoloration, especially in the field of such shaped articles which are exposed to combustion gas or NOx gas. In particular, the composition is useful for fibers.

The composition can be shaped by various known methods. For example in case of films, such a method can be applied as forming the composition into films by means of any conventional film extruder, optionally with simultaneous stretching. In case of fibers, such a method can be applied as melt-spinning the composition by any conventional manner and optionally stretching the resulting products, or melt-spinning the composition and thereafter subjecting the resulting products to a surface treatment with a finishing agent comprising oil, an antistatic agent and others followed by stretching.

The present invention will be explained in more detail hereunder with reference to Examples, which are only for illustrative but not limitative of the scope of the invention. In the Examples, given parts are by weight unless otherwise indicated.

Test additives used in the Examples are as follows, and they will be referred to hereinunder by the indicated letters.

A-1: 1,3,5-Tris(3,5-di-t-butyl-4-hydroxybenzyl) isocyanurate

A-2: 1,3,5-Tris(4-t-butyl-3-hydroxy-2,6-dimethylbenzyl) isocyanurate

A-3: Calcium bis(ethyl 3,5-di-t-butyl-4-hydroxybenzylphosphonate)

AO1: Tetrakis[methylene-3-(3,5-di-t-butyl-4-hydroxyphenyl)propionate]methane

B-1: 2,4-Di-t-pentyl-6-[1-(3,5-di-t-pentyl-2-hydroxyphenyl)ethyl]phenyl acrylate B-2: 2-t-Butyl-6-(3-t-butyl-2-hydroxy-5-methylbenzyl)-4-methylphenyl acrylate C-1: Bis(2,6-di-t-butyl-4-methylphenyl) pentaerythritol diphosphite C-2: Bis(2,4-di-t-butylphenyl) pentaerythritol diphosphite C-3: Tris(2,4-di-t-butylphenyl) phosphite C-4: Tetrakis(2,4-di-t-butylphenyl) 4,4'-biphenylene diphosphonite C-5: 2,2'-Ethylidenebis(4,6-di-t-butylphenyl) fluorophosphite C-6: 2,2'-Methylenebis(4,6-di-t-butylphenyl) octyl phosphite D-1: Polycondensate of dimethyl succinate with 1-(2-hydroxyethyl)-4-hydroxy-2,2,6,6-tetramethylpiperidine (TINUVIN 622 LD, produced by Ciba-Geigy Corp.)

D-2: Poly[{6-(1,1,3,3-tetramethylbutyl)imino-1,3,5-triazin-2,4-diyl)}{(2,2,6,6-tetramethyl-4-piperidyl)imino}hexamethylene{(2,2,6,6-tetramethyl-4-piperidyl)imino}] (CHIMASSORB 944 LD, produced by Ciba-Geigy Corp.)

D-3: Poly[(6-morpholino-1,3,5-triazin-2,4-diyl){(2,2,6,6-tetramethyl-4-piperidyl)imino)hexamethylene{(2,2,6,6-tetramethyl-4-piperidyl)imino}] (CYASORB UV-3346, produced by American Cyanamid Co.)

| Formulation | |
|---|---|
| Unstabilized Polypropylene | 100 parts |
| Calcium Stearate | 0.05 part |
| Test Additives | Shown in Tables 1 and 2 |

The above blend was admixed for 5 minutes in a mixer and thereafter extruded at 310° C. using a 40 mm$\phi$ extruder to pelletize the blend. The resulting pellets were subjected to melt spinning at a temperature of 340° C. and under a resin discharge pressure of 100 kgf/cm$^2$ (constant) using a 30 mm$\phi$ extruder having a die shape of 0.5 mm$\phi \times$ 36 holes, and the following characteristic items were evaluated.

(1) Heat Resistance

In the above melt spinning step, draw-off speed for the 36 filaments flowing out of the die was varied between 400 m/min. and 900 m/min. at an interval of 100 m/min., and the speed at which the filaments could be drawn without breakage was determined to evaluate the heat resistance during processing. Since filament breakage occurs due to deterioration of the resin caused by heat at the processing, no filament breakage or a higher speed capable of drawing out indicates excellent heat resistance during processing.

(2) Thermal Oxidation Resistance

The unstretched filaments obtained by the melt spinning were stretched 2.5 times the length at 135° C. to obtain fibers of 18 denier/filament. The fibers were cut into 5 cm lengths, and about 3 g thereof was bundled at the center to make a test specimen. The test specimen was put in a Geer oven at 135° C., and the period (days) until thermal discoloration occured was determined to evaluate the thermal oxidation resistance.

(3) Light Oxidation Resistance

Thirty six fibers of the 18 denier/filament obtained in item (2) above were twisted to make yarn. The resulting yarn was put in a xenone fade meter having a black panel temperature of 89° C., and the tensile strength of the yarn was measured every time after 50 kJ of energy was irradiated. The light oxidation resistance was evaluated by the energy dose needed to reduce the tensile strength by 50%.

(4) Resistance to Discoloration by Combustion Gas

The same test specimen as in item (2) above was prepared, and it was exposed for 30 minutes to combustion gas of 98° C. generated from city gas to evaluate the discoloration degree with visual judgement of the following five criteria, in which the smaller the value, the better the resistance to discoloration.

1 : No discoloration
2 : Slight discoloration
3 : Moderate discoloration
4 : Marked discoloration
5 : Severe discoloration The device utilized for the combustion gas exposure was a stainless steel cylinder having a diameter of 25 cm and a length of 70 cm, where the combustion gas was generated from the bottom and the test specimen was placed at the upper portion.

(5) Resistance to Discoloration by NOx Gas

The same test specimen as in item (2) above was prepared, and it was exposed to an atmosphere having an NOx concentration of 2% by volume for 24 hours in accordance with JIS L 0855 "Testing Method for Colour Fastness to Nitrogen Oxides". The discoloration degree was evaluated with the same visual judgement of the five criteria as described in item (4) above. The smaller the value, the better the resistance to discoloration.

The evaluation results of the above tests are shown in Table 1 and Table 2. In the tables, (1) to (5) appearing in the column of "Results" correspond to the characteristic items of the above evaluation tests and are as follows:

(1) Heat Resistance:
Speed capable of drawing out (m/min.)
(2) Thermal Oxidation Resistance:
Thermal discoloration period at 135° C. (days)
(3) Light Oxidation Resistance:
Energy dose until the tensile strength is reduced by half
(4) Resistance to Discoloration by Combustion Gas
(5) Resistance to Discoloration by NOx Gas

TABLE 1

| | Runs Of the Invention | | | | | | | | |
|---|---|---|---|---|---|---|---|---|---|
| | Test Additives (kind and part) | | | | Results | | | | |
| Run No. | Phenolic Compound | Acrylate Compound | Phosphorous Compound | Piperidine Compound | (1) m/min. | (2) days | (3) kJ | (4) | (5) |
| 1 | A-1 0.1 | B-1 0.1 | C-1 0.1 | D-1 0.1 | 700 | 14 | 450 | 1 | 2 |
| 2 | " | B-2 0.1 | " | " | " | " | " | " | " |
| 3 | " | B-1 0.1 | C-2 0.1 | " | " | 13 | " | " | " |
| 4 | " | " | C-3 0.1 | " | " | " | " | " | " |
| 5 | " | " | C-4 0.1 | " | " | " | " | " | " |
| 6 | " | " | C-5 0.1 | " | " | " | " | " | " |
| 7 | " | " | C-6 0.1 | " | " | 12 | " | " | " |
| 8 | " | " | C-1 0.1 | D-2 0.1 | " | 17 | 500 | " | 3 |
| 9 | " | " | " | D-3 0.1 | " | 16 | " | " | " |
| 10 | A-2 0.1 | " | " | D-1 0.1 | " | 14 | 450 | " | 2 |
| 11 | " | " | " | D-2 0.1 | " | 18 | 500 | " | 3 |
| 12 | " | " | " | D-3 0.1 | " | 17 | " | " | " |
| 13 | " | B-2 0.1 | " | D-2 0.1 | " | 18 | " | " | " |

TABLE 1-continued

Runs Of the Invention

| Run No. | Test Additives (kind and part) | | | | Results | | | | |
| --- | --- | --- | --- | --- | --- | --- | --- | --- | --- |
| | Phenolic Compound | Acrylate Compound | Phosphorous Compound | Piperidine Compound | (1) m/min. | (2) days | (3) kJ | (4) | (5) |
| 14 | A-3 0.1 | B-1 0.1 | " | D-1 0.1 | " | 12 | 450 | " | 2 |
| 15 | " | " | " | D-2 0.1 | " | 15 | 500 | " | 3 |
| 16 | " | " | " | D-3 0.1 | " | 14 | " | " | " |
| 17 | " | B-2 0.1 | " | D-2 0.1 | " | 15 | " | " | " |
| 18 | A-1 0.2 | B-1 0.1 | " | " | " | 19 | 550 | 2 | " |
| 19 | A-1 0.1 | B-1 0.2 | " | " | 900 | 17 | 500 | 1 | " |
| 20 | A-1 0.1 | B-1 0.1 | C-1 0.2 | " | 700 | 18 | " | " | 2 |
| 21 | " | " | C-1 0.1 | D-2 0.2 | 600 | 19 | 700 | 2 | 3 |

TABLE 2

Runs for Comparison

| Run No. | Test Additives (kind and part) | | | | Results | | | | |
| --- | --- | --- | --- | --- | --- | --- | --- | --- | --- |
| | Phenolic Compound | Acrylate Compound | Phosphorous Compound | Piperidine Compound | (1) m/min. | (2) days | (3) kJ | (4) | (5) |
| 22 | A-1 0.1 | B-1 0.1 | C-1 0.1 | — | 900 | 7 | 100 | 1 | 4 |
| 23 | " | " | — | D-2 0.1 | 700 | 12 | 350 | 2 | 4 |
| 24 | " | — | C-1 0.1 | " | less than 400 | 10 | " | " | " |
| 25 | — | B-1 0.1 | " | " | 600 | 3 | " | " | 3 |
| 26 | A-2 0.1 | " | " | — | 900 | 8 | 100 | 1 | " |
| 27 | " | " | — | D-2 0.1 | 700 | 13 | 350 | 2 | " |
| 28 | " | — | C-1 0.1 | " | less than 400 | 11 | " | " | " |
| 29 | A-3 0.1 | B-1 0.1 | " | — | 900 | 5 | 100 | " | 4 |
| 30 | " | " | — | D-2 0.1 | 700 | 10 | 350 | " | " |
| 31 | " | — | C-1 0.1 | " | less than 400 | 7 | " | " | " |
| 32 | AO1 0.1 | B-1 0.1 | " | " | 700 | 15 | 400 | 3 | 5 |
| 33 | AO1 0.2 | " | " | " | " | 17 | " | " | " |

The polyolefin composition blended with a particular hindered phenolic compound, a particular acrylate compound, a particular organic phosphorous compound and a particular hindered piperidine compound, according to the present invention, has practically a sufficient stability against heat during high temperature processing and against thermal oxidation and light oxidation during usage, and also it exhibits high resistance against discoloration by combustion gas or NOx gas.

While the invention has been described in detail and with reference to specific embodiments and examples, it is to be understood for the person skilled in the art that the invention is not limited to the details given herein but may be modified and changed within the spirit and scope of the appended claims.

What is claimed is:

1. A polyolefin composition comprising a polyolefin and, per 100 parts by weight of the polyolefin, the following components:

(A) 0.01 to 1 part by weight of a hindered phenolic compound selected from the group consisting of 1,3,5-tris(3,5-di-t-butyl-4-hydroxybenzyl) isocyanurate, 1,3,5-tris(4-t-butyl-3-hydroxy-2,6-dimethylbenzyl) isocyanurate, and calcium bis(ethyl 3,5-di-t-butyl-4-hydroxybenzylphosphonate);

(B) 0.01 to 1 part by weight of an acrylate compound represented by the formula (I):

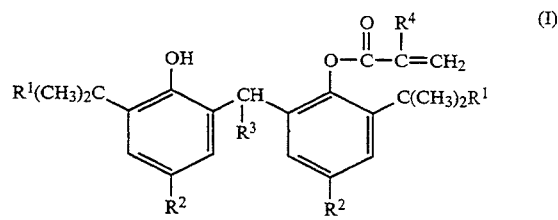

wherein $R^1$ is an alkyl of 1 to 5 carbon atoms, $R^2$ is an alkyl of 1 to 8 carbon atoms, $R^3$ is hydrogen or an alkyl of 1 to 8 carbon atoms, and $R^4$ is hydrogen or methyl;

(C) 0.01 to 1 part by weight of an organic phosphorous compound selected from the group consisting of bis(2,6-di-t-butyl-4-methylphenyl) pentaerythritol diphosphite, bis(2,4-di-t-butylphenyl) pentaerythritol diphosphite, tris(2,4-di-t-butylphenyl) phosphite, tetrakis(2,4-di-t-butylphenyl) 4,4'-biphenylene diphosphonite, 2,2'-ethylidenebis(4,6-di-t-butylphenyl) fluorophosphite, and 2,2'-methylenebis(4,6-di-t-butylphenyl) octyl phosphite; and (D) 0.01 to 1 part by weight of a hindered piperidine compound selected from the group consisting of a polycondensate of dimethyl succinate with 1-(2-hydroxyethyl)-4-hydroxy-2,2,6,6-tetramethylpiperidine, poly[{(6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}], and poly[(6-morpholino-1,3,5-triazin-2,4-diyl){(2,2,6,6-tetramethyl-4-piperidyl)imino}hexamethylene{(2,2,6,6-tetramethyl-4-piperidyl)imino}].

2. The polyolefin composition of claim 1, wherein the polyolefin is a homopolymer of an α-olefin or a copolymer of two or more of the α-olefins.

3. The polyolefin composition of claim 2, wherein the polyolefin is polypropylene.

4. The polyolefin composition of claim 1, wherein the acrylate compound of the component (B) is represented by the formula (I) in which $R^1$ is methyl or ethyl, $R^2$ is methyl, t-butyl or t-pentyl, $R^3$ is hydrogen or methyl, and $R^4$ is hydrogen.

5. The polyolefin composition of claim 4, wherein the acrylate compound is 2,4-di-t-pentyl-6-[1-(3,5-di-t-pentyl-2-hydroxyphenyl)ethyl]phenyl acrylate or 2-t-butyl-6-(3-t-butyl-2-hydroxy-5-methylbenzyl)-4-methylphenyl acrylate.

6. The polyolefin composition of claim 1, wherein the organic phosphorous compound of the component (C) is bis(2,6-di-t-butyl-4-methylphenyl) pentaerythritol diphosphite.

7. The polyolefin composition of claim 1, wherein the hindered piperidine compound of the component (D) is poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}], or poly[(6-morpholino-1,3,5-triazin-2,4-diyl){(2,2,6,6-tetramethyl-4-piperidyl)imino}hexamethylene{(2,2,6,6-tetramethyl-4-piperidyl)imino}].

8. The polyolefin composition of claim 1, wherein the component (A) is present in an amount of from about 0.02 to about 0.5 part by weight, the component (B) is present in an amount of from about 0.02 to about 0.5 part by weight, the component (C) is present in an amount of from about 0.02 to about 0.5 part by weight, and the component (D) is present in an amount of from about 0.02 to about 0.5 part by weight, each per 100 parts by weight of the polyolefin.

9. A process for producing a polyolefin shaped article which comprises blending a polyolefin with:

(A) a hindered phenolic compound selected from the group consisting of 1,3,5-tris(3,5-di-t-butyl-4-hydroxybenzyl) isocyanurate, 1,3,5-tris(4-t-butyl-3-hydroxy-2,6-dimethylbenzyl) isocyanurate, and calcium bis(ethyl 3,5-di-t-butyl-4-hydroxybenzylphosphonate);

(B) an acrylate compound represented by the formula (I):

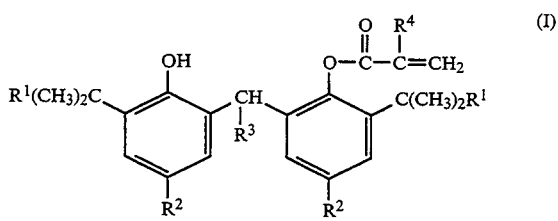

wherein $R^1$ is an alkyl of 1 to 5 carbon atoms, $R^2$ is an alkyl of 1 to 8 carbon atoms, $R^3$ is hydrogen or an alkyl of 1 to 8 carbon atoms, and $R^4$ is hydrogen or methyl;

(C) an organic phosphorous compound selected from the group consisting of bis(2,6-di-t-butyl-4-methylphenyl) pentaerythritol diphosphite, bis(2,4-di-t-butylphenyl) pentaerythritol diphosphite, tris(2,4-di-t-butylphenyl) phosphite, tetrakis(2,4-di-t-butylphenyl) 4,4'-biphenylene diphosphonite, 2,2'-ethylidenebis(4,6-di-t-butylphenyl) fluorophosphite, and 2,2'-methylenebis(4,6-di-t-butylphenyl) octyl phosphite; and (D) a hindered piperidine compound selected from the group consisting of a polycondensate of dimethyl succinate with 1-(2-hydroxyethyl)-4-hydroxy-2,2,6,6-tetramethylpiperidine, poly[{6-(1,1,3,3-tetramethylbutyl)imino-1,3,5-triazin-2,4-diyl}{(2,2,6,6-tetramethyl-4-piperidyl)imino}hexamethylene{(2,2,6,6-tetramethyl-4-piperidyl)imino}], and poly[(6-morpholino-1,3,5-triazin-2,4-diyl){(2,2,6,6-tetramethyl-4-piperidyl)imino}hexamethylene{(2,2,6,6-tetramethyl-4-piperidyl)imino}]; and forming the resulting composition into a shaped article, whereby the shaped article is stabilized against heat, light and oxidation as well as against discoloration by combustion gas or nitrogen oxides gas.

10. The process of claim 9, wherein the forming is effected by melt-spinning the composition followed by stretching to prepare a fiber.

11. The process of claim 9, wherein the forming is effected by extruding the composition into a film.

12. A polyolefin fiber prepared from the composition of claim 1.

13. A polyolefin film prepared from the composition of claim 1.

* * * * *